Figure 1:
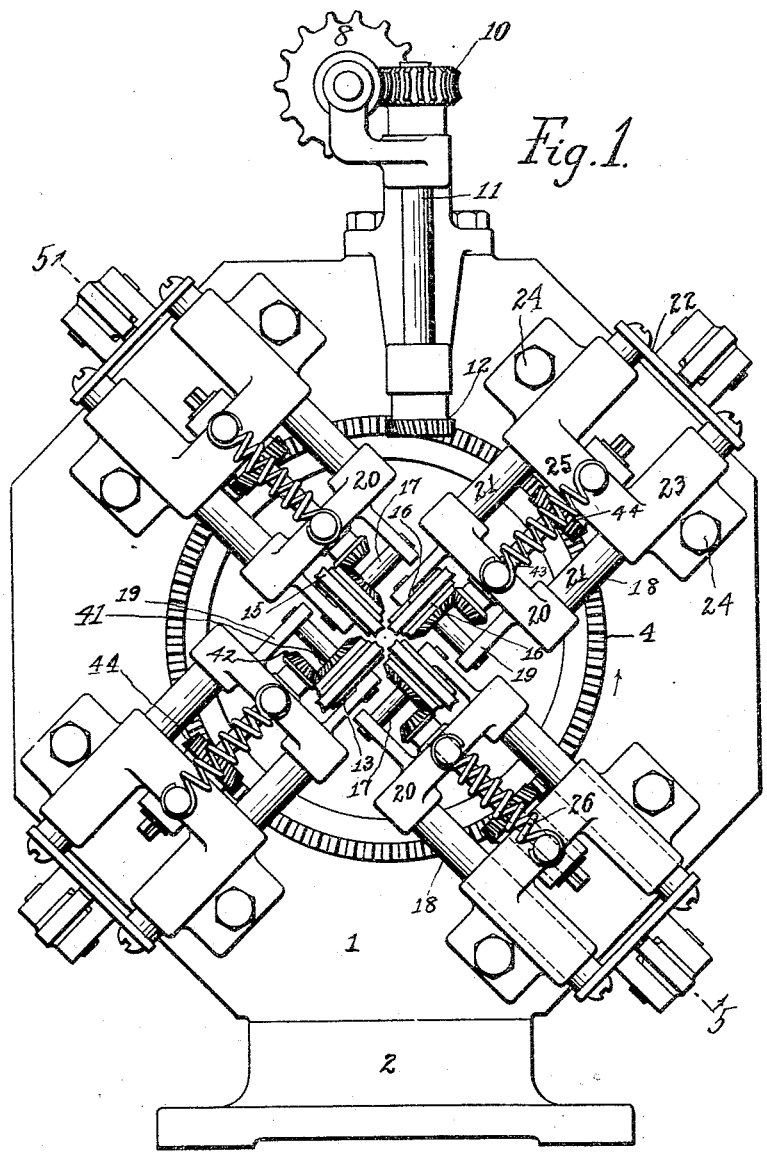

B. V. EDWARDS.
BALLOON STRIPPING MACHINE.
APPLICATION FILED APR. 18, 1913.

1,142,945.

Patented June 15, 1915.
4 SHEETS—SHEET 1.

WITNESSES
Lillian M. Funke
Daniel B. Smith

INVENTOR
Bruce V. Edwards
BY
H. H. Dyke
ATTORNEYS

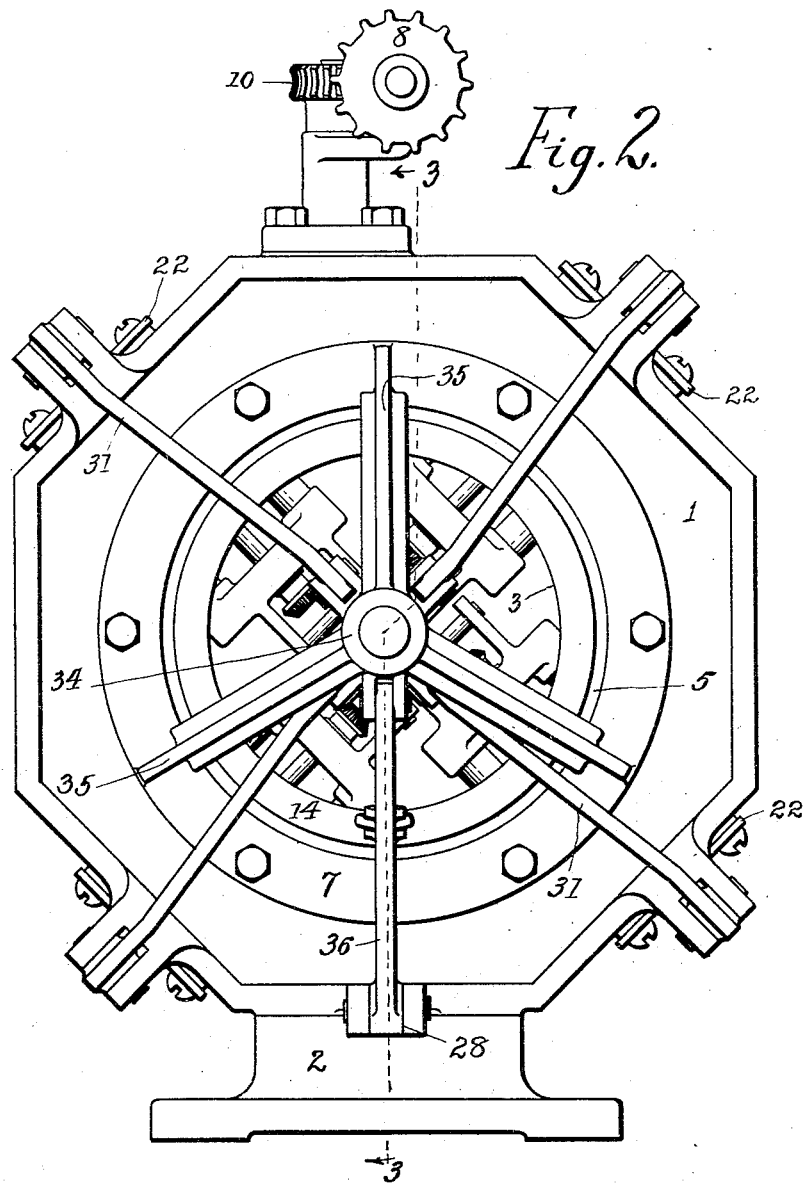

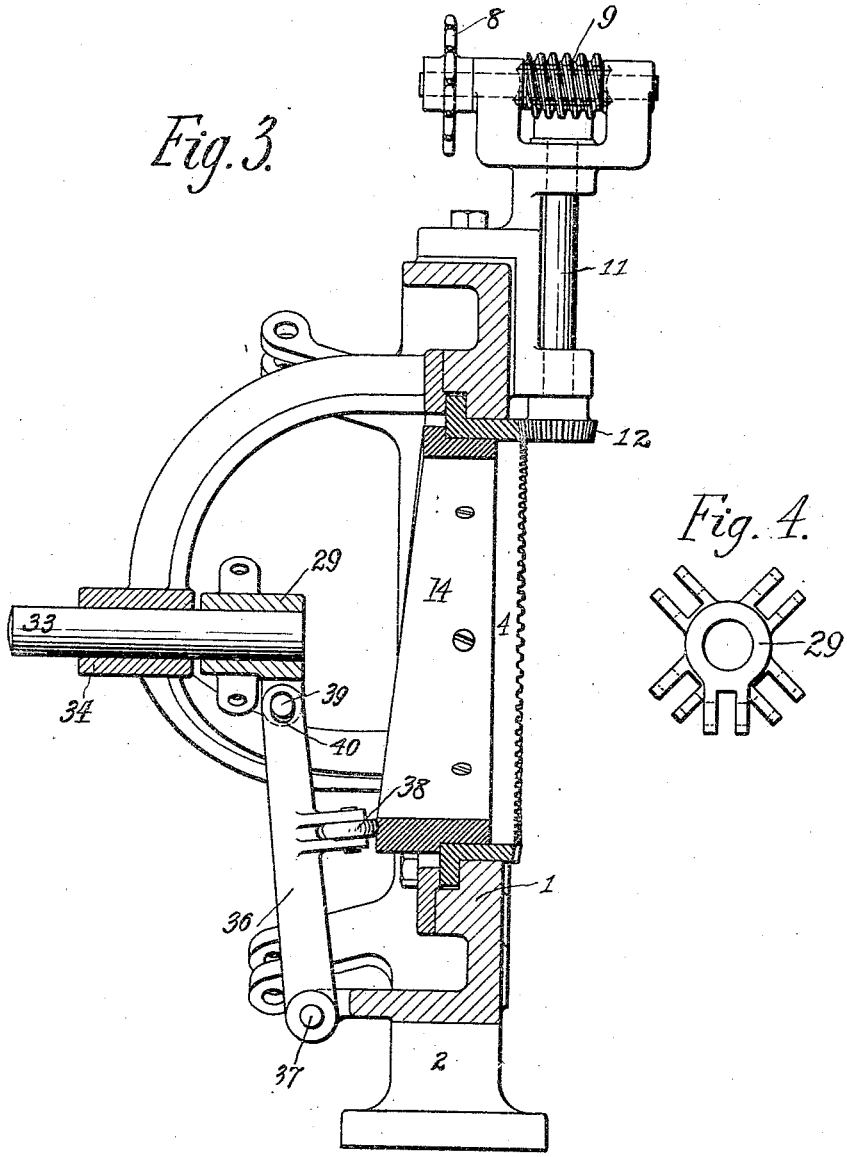

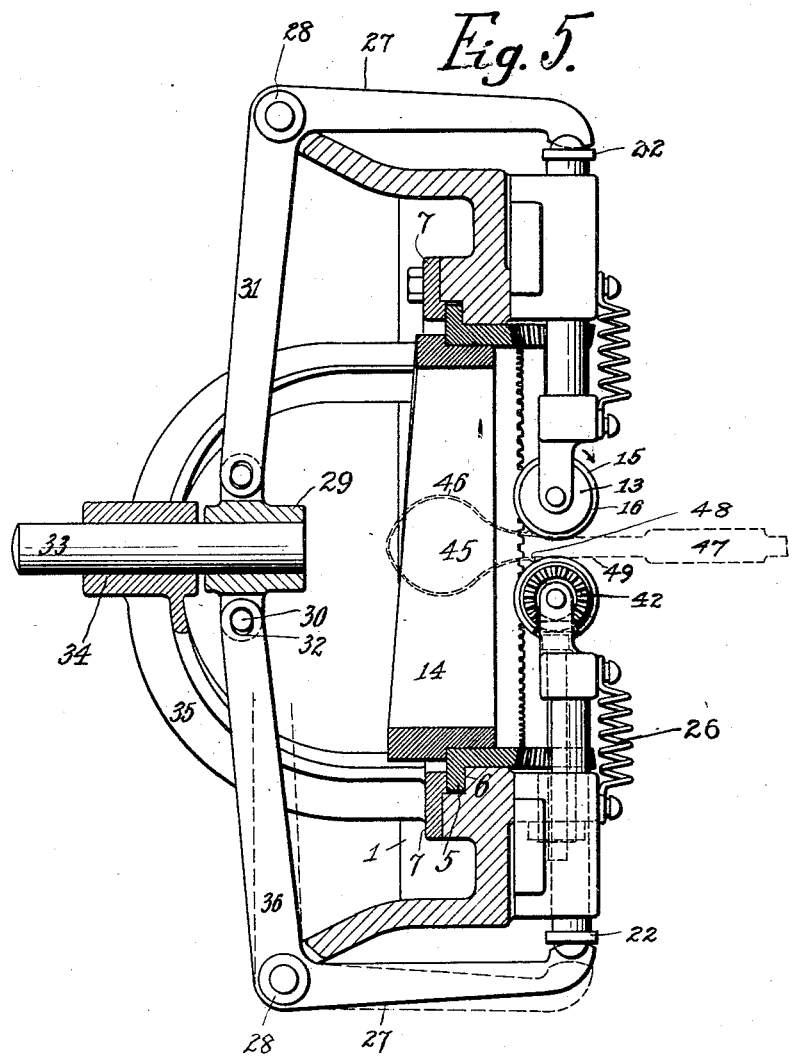

UNITED STATES PATENT OFFICE.

BRUCE V. EDWARDS, OF NEWARK, NEW JERSEY, ASSIGNOR TO EDWARDS ENGINEERING & MANUFACTURING COMPANY, OF NEWARK, NEW JERSEY, A CORPORATION OF NEW JERSEY.

BALLOON-STRIPPING MACHINE.

1,142,945.  Specification of Letters Patent.  Patented June 15, 1915.

Application filed April 18, 1913. Serial No. 762,015.

*To all whom it may concern:*

Be it known that I, BRUCE V. EDWARDS, a citizen of the United States, and a resident of Newark, county of Essex, and State of New Jersey, have invented a certain new and useful Balloon-Stripping Machine, of which the following is a specification.

This invention concerns the removing or stripping of flexible envelops from molds or forms and it is available for use in all cases where such removal or stripping is to be accomplished. In the manufacture of toy rubber balloons, for example, it is customary to form the rubber bag or envelop, which when inflated forms the balloon (and which will hereinafter be referred to as the balloon) upon a mold or core which is generally pear-shaped in form and is provided with an axial projection or handle, upon which the neck of the balloon is formed, and by means of which handle the mold or core can conveniently be held and manipulated. This mold or core is coated with the material of which the balloon is to be formed, and which in the art as practised at the present time, is a solution of rubber in a suitable solvent, as by immersing the mold or core in a bath of the liquid material, which immersion may be repeated one or more times according to the thickness of the coating desired and drying or curing the balloon so formed on the mold. When the article has been completed in this or any other equivalent manner it will be extremely strong and flexible and elastic. The method of forming the balloon on the core, however, forms no part of the present invention which is particularly concerned with the removing of the completed balloon from the core.

As the mold or core used in the manufacture of toy balloons is necessarily of a form generally similar to the form of the complete inflated balloon, but much smaller, or, in other words, is generally pear-shaped in form and the neck is comparatively slender, considerable difficulty is encountered in removing the balloon from the core, and up to the present time this removal has been accomplished, so far as I am aware, entirely by hand, the material of the balloon at the neck being rolled manually back upon itself, in much the same way as a stocking is turned inside-out, and this rolling upon itself is continued and the slender neck of the balloon is stretched over the mold or form until the roll is forced over the greatest diameter of the mold, when the balloon will snap off the outer end of the form, after the region of the greatest diameter has been passed, by reason of the elasticity of the material of which it is made. This operation of stripping balloons from molds by hand is very tedious and is accomplished only with extreme difficulty.

The principal object of the present invention is to provide mechanical means for doing work of the character referred to, and the apparatus shown herein, while particularly designed for stripping toy balloons from pear-shaped molds on which they are formed, is capable of use generally when any flexible, elastic envelop is to be removed from a mold or core of any kind.

Other objects of the present invention will appear in the course of this specification, and with the foregoing and related objects in view, my invention consists in the means and combinations hereinafter set forth and claimed.

While I have illustrated a specific embodiment of my invention for the purpose of affording a clear disclosure thereof, it is to be understood that my invention is not limited thereto but is as broad as my claims, and that numerous changes may be made from the specific form which is shown without departure from the spirit or sacrifice of the advantages of my invention.

It is to be understood that what is said herein with respect to the stripping of toy balloons from molds applies as well to the removing of other flexible envelops from molds or cores of any kind. There are two principal effects necessary to be secured in stripping the balloon from the mold; the balloon must be rolled up on itself from the neck and must be subjected to firm gripping pressure thrusting it outward and expanding on the form until the region of greatest girth is reached or until it is entirely forced off the mold. When the operation is to be performed by hand the handle of the mold may be gripped firmly by the operator with one hand and the other hand may be used for rolling the balloon back on itself and thrusting it over and expanding it upon the mold. The form of machine which I have illustrated serves only for gripping, rolling up, expanding and thrusting off the balloon from the mold, and with the construction of machine illustrated, the operator is depended upon for applying the necessary endwise pull on the form by grasping the exposed end or handle. Mechanical means may be made use of for pulling the mold endwise if desired, but as a very greatly increased number of balloons can be stripped from the molds over prior practice with the machine illustrated, in which all the operator has to do is to pull the mold with the balloon thereon through the machine, thereby stripping the balloon from the mold, I have not illustrated mechanical means for this purpose.

For stripping the balloon I preferably make use of a plurality of positively rotated stripping wheels having a friction surface and conforming as closely as possible to the surface of the mold upon which the balloon is formed. Wheels provided with a gripping surface of rubber may be conveniently and successfully employed for this purpose, although other friction materials may be used. It is necessary in addition to imparting rotation to such wheels that, as the mold and the balloon thereon being stripped is pulled up between the stripping wheels, they should separate to accommodate the gradually increasing girth of the mold. As the grip upon the balloon must be maintained firmly at all times, I find that while the stripping wheels should be permitted to separate they must be firmly and positively maintained in close contact with the surface of the mold, and to this end I provide means for permitting the rotating stripping wheels to be separated, but which nevertheless prevent any undue giving or loosening of the grip of the stripping wheels upon the bead shaped roll of the balloon material which is being stripped from the mold.

Another feature of my invention consists in so mounting the stripping wheels that they may be rotated while being moved inward and outward toward and away from one another and in maintaining a space in the center where the actual stripping process takes place free and open, except for the presence of the stripping wheels, for the admission of the mold with the balloon thereon which is to be subjected to the operation of stripping.

In the drawings forming a part of this specification, and in which the same reference numerals are applied to the same parts throughout, Figure 1 is a front elevational view of an illustrative form of machine embodying my invention; Fig. 2 is a rear elevational view thereof; Fig. 3 is a cross-sectional view taken on the line 3—3, Fig. 2; Fig. 4 is a detail showing the manner of connecting levers to a slide forming part of the structure, and Fig. 5 is a cross sectional view taken on line 5—5, Fig. 1.

In the said drawings reference numeral 1 is applied to the frame of the device, which is shown as being octagonal in form, although it may be of any form which will provide accommodation for the various working parts; and a base 2 is provided for supporting the frame on any convenient support or foundation. The frame 1 is provided with a substantially central aperture 3 leaving plenty of room in the center of the aperture for the admission of the articles to be operated upon. Within the central opening 3 a ring shaped gear wheel 4 is rotatably received and the gear wheel 4 is provided with a flange 5 resting against the shoulder 6, and is held against this shoulder 6 by suitable retaining means, as the ring 7 secured to the back of the frame 1, but not fitting closely enough to bind the gear wheel 4, and permitting the same to rotate within the frame. The gear wheel 4 is driven from any suitable source of power, which may be applied for example as by a sprocket chain to the sprocket wheel 8, and is communicated to the gear wheel 4 through the worm 9, worm wheel 10, shaft 11 and gear 12, although other means for driving the gear wheel may of course be resorted to. The function of the gear wheel 4 is to impart rotation to the stripping wheels 13 through means presently to be described. As already stated the stripping wheels must be capable of movement away from one another to accommodate the increasing diameter of the mold as it is pulled through between them, and in the form of apparatus shown this movement of the stripping wheels is controlled by the cam 14 which may also be driven from any suitable source of power but may conveniently and advantageously be arranged as in the form of construction shown, in which the cam 14 is secured to and rotated with the gear wheel 4, so that the provision of separate or additional means for driving the cam 14 is dispensed with.

The stripping wheels 13 may conveniently be formed of a central disk 15 of rubber secured between side disks 16, which are preferably of metal and of lesser diameter than the central rubber disk. The central disk 15 of rubber or other friction material is provided with a peripheral groove to conform as closely as possible to the form of the mold or core and to secure a firm gripping action in the balloon to be stripped. The stripping wheels 13 are mounted upon the shafts 17 which are rotatably mounted in sliding frames 18 as by being journaled between lugs 19 projecting therefrom. The slides 18 comprise cross heads 20, slide rods 21 and cross bars 22. The cross heads 20 and cross bars 22 serve to connect the slide rods 21 of which two are shown for each slide and to hold them in parallelism. The cross bars 22 are preferably made of comparatively thin material so that, being supported at their ends, they will give slightly when pressure is applied at the center. The slides 18 are mounted for sliding in suitable slide-ways formed on or secured to the frame. In the construction shown these slide-ways, which are designated by reference numeral 23, are formed separate from the frame 1 and are bolted thereto as at 24. These slide-ways are preferably U-shaped in form and are provided on each of their sides with apertures for the passage of the slide rods 21, and the side members 23 are preferably connected by a web or cross member 25, and springs 26 secured respectively to the cross heads 20 of the sliding frames 18 and to a stationary part of the mechanism, as for example the cross members 25 of the slide ways 23, serve to pull the slides 18 and the stripping wheels 13 carried thereby outward and separate them from one another. This tendency of the stripping wheels to be separated from one another, which is increased by the action of the operator in pulling the mold through between the stripping wheels, is opposed by members operatively connected with the cam 14. In the construction shown, these means comprise bell cranks 27 pivoted to the frame 1 or extensions thereof at 28, and pivotally secured to a slide 29 at 30. Provision is made at the point of pivoting 30 for slight endwise movement of the arms 31 of the bell crank 27 as by the provision of elongated slots 32. The outer arms of the bell cranks 27 rest against the cross bar 22 of the slides 18 substantially midway between the point of support thereof upon the slide bars 21, and the cross bars 22 being formed of comparatively thin material permit a slight give to the slides 18 when they are forced outward against the bell cranks 27 but such slight give, while sufficient to compensate for any small irregularities in the mold or in the parts of the structure, is not sufficient to prevent a firm contact of the stripping wheels with the mold and the balloon being forced off the mold. The slide 29 is mounted for sliding upon the frame in any convenient manner. As shown a slide bar 33 is secured thereto and is received in a slideway 34, which is secured to the frame 1 as by means of the curved arms 35. Any suitable means for moving the slide 29 with the bell cranks 27 attached thereto from the cam 14 may be resorted to. In the construction shown, a lever 36 is pivoted in the frame at 37 and is provided with a roller 38 bearing upon the rear cam surface of the cam 14, and is pivoted to the slide 29 as at 39, provision being made at the last named pivoting point for slight endwise movement relative to the slide 29 which may be accomplished by means of the elongated slot 40. As will be apparent, the pull of the contractile springs 26 upon the slides 18 is imparted to the bell cranks 27 and tends to force the slide 29 toward the cam 14 and thus serves to maintain the roller 38 on the lever 36 forcibly in contact with the cam 14.

Any suitable means for rotating the stripping wheels 13 from the gear wheel 4 may be used. In the construction shown bevel gears 41 are secured upon the stripping wheel shaft 17 and mesh with bevel gears 42. The bevel gears 42 are secured to shafts 43 which are splined in the gears 44 mounted for rotation in the cross members 25 of the sliding frames 23 and meshing with the gear wheel 4. As the slides 18 are moving inward and outward the shafts 43 are moving lengthwise within the gears 44 but being splined therein serve to impart continuous rotation to the bevel gears 42 and therefore to the stripping wheels 13.

The operation of the apparatus will be clearly understood from the foregoing. Rotation being imparted to the gear wheel 4 and cam 14, as by the application of power by suitable means to the sprocket wheel 8 and gear wheel 4 being turned in the direction of the arrow shown in Fig. 1, the stripping wheels 13 through the connections which have been described are continuously rotated so that their adjacent sides travel toward the back of the machine, and this rotation continues at all times while power is applied notwithstanding the movements of the slides 18 and of the stripping wheels 13 therewith. As the cam 14 is rotated with the gear wheel 4 the slide 29 is thrust toward the left in Fig. 3 by the roller 38 riding outward on the cam 14, thus throwing the frames 18 and stripping wheels 13 together, and at the point of greatest outward movement of the cam 14, these slides and the stripping wheels 13 assume the position nearest one another as shown in Figs. 1 and 5. As the rotation of the cam is continued the springs 26, as well as the pull of the operator on the balloon mold, tend to force the slides 18 and the stripping wheels 13 outward and force the slide 29 toward the cam 14, and maintain the roller 38 in constant contact therewith, and the cam 14 acting through the bell crank levers 27 in turn positively limits the outward movement of the slides 18 and stripping wheels 13 and positively maintains the latter in firm gripping contact with the mold or core and the balloon being stripped therefrom. The mold or core upon which the balloon is formed is indicated in dotted lines at 45 in Fig. 5, the balloon thereon is indicated in dotted lines at 46 and the handle of the mold is indicated at 47. At 48 the bead formed by rolling the balloon back on itself at its neck is indicated. When the roller 38 has reached its furthest limit of travel on the cam 14 toward the gear wheel 4, the slides 18 and stripping wheels 13 are separated to the furthest extent, as will be understood. This furthest separation of the stripping wheels 13 is preferably somewhat greater than the greatest diameter of the mold 45, thus permitting a new mold with a balloon thereon to be inserted between the stripping wheels 13 as soon as the operation of stripping the balloon from the mold last operated upon has been completed. The rotation of the gear wheel 4 and cam 14 being continuous, the stripping wheels 13, rotating in the direction of the arrow shown in Fig. 5, approach one another and their friction surface 15 comes into contact with the stem 49 of the mold 45. As soon as the stripping wheels 13 come into contact with the stem 49 the operator begins pulling upon the handle 47 of the mold 45 and, as the stripping wheels are continuously rotated in the direction shown in Fig. 5 and are permitted to separate as the slides 18 are moved outward by the springs 26 but are prevented from separating faster than is required to accommodate the increasing diameter of the mold 45 by the bell cranks 27, slide 29, lever 36 and roller 38 in contact with the cam 14, the balloon is rolled back upon itself and thrust upward and outward upon the mold 45 and finally is thrust off the mold as the point of greatest diameter is reached. Any suitable means (not shown) may be provided for collecting or conveying away the balloons which have been stripped from the molds. As soon as one mold from which the balloon has been stripped has been removed from between the stripping wheels 13, another is inserted with the balloon thereon and preferably during the slightly continued outward travel of the stripping wheels 13, so that a balloon may be stripped from a mold at each rotation of the gear wheel 4 and the cam 14 although, of course, the stripping wheels 13 may be permitted to approach one another and the succeeding mold with the balloon to be stripped therefrom may be inserted at any subsequent period.

It will be apparent that the structure described and operated as above set forth removes the difficulty heretofore experienced in stripping balloons or other envelops from molds or cores and that by its use it is readily possible to perform such stripping operation with extreme rapidity and without any considerable effort on the part of the operator who has only to insert the mold with the balloon thereon between the stripping wheels 13 and pull the mold out as the stripping wheels rotate and are separated, whereupon the balloon will be rolled back upon itself and fly off the end of the mold.

Having now described my invention, I claim:

1. In a device of the class described, the combination of a plurality of rotatable friction members mounted for radial movement toward and away from a common center, means for moving said members radially toward and away from the common center while out of contact with one another, and means for imparting rotation thereto simultaneously with the to and fro movement thereof, for the purposes set forth.

2. In a device of the class described, the combination of a plurality of peripherally grooved rotatable friction members mounted for radial movement toward and away from a common center, means for moving the said members to and away from the common center while out of contact with one another, and means for imparting rotative movement thereto as said members are moved to and away from the common center, for the purposes set forth.

3. In a device of the class described, the combination of a plurality of rotatable friction members mounted for radial movement toward and away from a common center while out of contact with one another, means for moving said members to and away from the common center, and means common to said friction members for imparting rotation thereto during the to and fro movement thereof, and causing the sides thereof next to the common center to be rotated in the same direction, for the purposes set forth.

4. In a device of the class described, the combination of a plurality of peripherally grooved rotatable friction members mounted for radial movement toward and away from a common center while out of contact with one another, means for moving said friction members toward and away from the common center, and means common to said friction members for imparting rotation thereto, and causing the sides thereof next to the common center to be rotated in the same direction during the to and fro movement of said members, for the purposes set forth.

5. In a device of the class described, the combination of a plurality of rotatable wheels provided with friction surfaces and mounted for radial movement toward and away from a common center while out of contact with one another, means for moving said wheels toward and away from the common center, and means for imparting rotation thereto during said radial movement, for the purposes set forth.

6. In a device of the class described, the combination of a plurality of rotatable wheels provided with peripherally grooved friction surfaces and mounted for radial movement toward and away from a common center while out of contact with one another, means for moving said wheels toward and away from the common center, and means for imparting rotation thereto during said radial movement, for the purposes set forth.

7. In a device of the class described, the combination of a plurality of rotatable wheels provided with friction surfaces and mounted for radial movement toward and away from a common center while out of contact with one another, means for moving said wheels toward and away from the common center, and means common to said friction wheels for imparting rotation thereto, and causing the sides of said friction wheels next to the common center to be rotated in the same direction, for the purposes set forth.

8. In a device of the class described, the combination of a plurality of rotatable wheels provided with peripherally grooved friction surfaces and mounted for radial movement toward and away from a common center while out of contact with one another, means for imparting radial movement to said wheels to and from the common center, and means common to said friction wheels for imparting rotation thereto during the radial movement thereof, and causing the sides of said friction wheels next to the common center to be rotated in the same direction, for the purposes set forth.

9. In a device of the class described, the combination of a plurality of rotatable friction members mounted for movement toward and away from one another and interconnected means for controlling the to and fro movement of said friction members and for imparting rotation thereto during such to and fro movement, for the purposes set forth.

10. In a device of the class described, the combination of a plurality of rotatable friction members mounted for movement toward and away from one another and interconnected means for controlling the to and fro movement of said friction members and for rotating said friction members so that adjacent sides thereof are moved in the same direction during such to and fro movement, for the purposes set forth.

11. In a device of the class described, the combination of a plurality of rotatable wheels provided with peripherally grooved friction surfaces mounted for movement toward and away from one another and interconnected means for controlling the to and fro movement of said friction wheels and for imparting rotation thereto during such to and fro movement, for the purposes set forth.

12. In a device of the class described, the combination of a plurality of rotatable wheels provided with peripherally grooved friction surfaces mounted for movement toward and away from one another and interconnected means for controlling the to and fro movement of said friction wheels and for rotating said friction wheels so that adjacent sides thereof are moved in the same direction during such to and fro movement, for the purposes set forth.

13. In a device of the class described, the combination of a plurality of rotatable friction members mounted for movement toward and away from one another and means comprising a common rotatable member for controlling the to and fro movement of said friction members and for imparting rotation thereto during such to and fro movement, for the purposes set forth.

14. In a device of the class described, the combination of a plurality of rotatable friction members mounted for movement toward and away from one another and means comprising a common rotatable member for controlling the to and fro movement of said friction members and for rotating said friction members so that adjacent sides thereof are moved in the same direction during such to and fro movement, for the purposes set forth.

15. In a device of the class described, the combination of a plurality of rotatable wheels provided with peripherally grooved friction surfaces mounted for movement toward and away from one another and means comprising a common rotatable member for controlling the to and fro movement of said friction wheels and for imparting rotation thereto during such to and fro movement, for the purposes set forth.

16. In a device of the class described, the combination of a plurality of rotatable wheels provided with peripherally grooved friction surfaces mounted for movement toward and away from one another and means comprising a common rotatable member for controlling the to and fro movement of said friction wheels and for rotating said friction wheels so that adjacent sides thereof are moved in the same direction during such to and fro movement, for the purposes set forth.

17. In a device of the class described, the combination of a plurality of friction members mounted for rotation and radial movement in planes radiating from a common axis, means for moving said friction members to and away from the common axis in said radiating planes and while out of contact with one another, and means for imparting rotation to each thereof about its own axis in its various radial positions, substantially as set forth.

18. In a device of the class described, the combination of a plurality of peripherally grooved rotatable friction members mounted for rotation and radial movement in planes radiating from a common axis, means for moving said members to and fro in said planes and while out of contact with one another, and means for imparting rotation to each thereof about its own axis in its various radial positions, substantially as set forth.

19. In a device of the class described, the combination of a plurality of rotatable friction members mounted for rotation and radial movement in planes radiating from a common axis, means for moving said members to and fro in said radiating planes and while out of contact with one another, and means common to the friction members for imparting rotation thereto in the various axial positions thereof, and causing the sides thereof next to the common axis to be rotated in the same direction, substantially as set forth.

20. In a device of the class described, the combination of a plurality of peripherally grooved rotatable friction members mounted for rotation and radial movement in planes radiating from a common axis, means for moving said members toward and away from the common axis in said radiating planes and while out of contact with one another, and means common to said friction members for imparting rotation thereto in the various radial positions thereof, and causing the sides thereof next to the common axis to be rotated in the same direction, substantially as set forth.

21. In a device of the class described, the combination of a plurality of rotatable wheels provided with friction surfaces and mounted for rotation and radial movement in planes radiating from a common axis, means for moving said wheels toward and away from the common axis in said radiating planes and while out of contact with one another, and means for imparting rotation to each thereof about its own axis in its various radial positions during such radial movement, substantially as set forth.

22. In a device of the class described, the combination of a plurality of rotatable wheels provided with peripherally grooved friction surfaces and mounted for rotation and radial movement in planes radiating from a common axis, means for moving said wheels toward and away from the said common axis in said radiating planes and while out of contact with one another, and means for imparting rotation to each thereof about its own axis in its various radial positions during said radial movement, substantially as set forth.

23. In a device of the class described, the combination of a plurality of rotatable wheels provided with friction surfaces and mounted for rotation and radial movement in planes radiating from a common axis, means for moving said wheels toward and away from the common axis in said radial planes and while out of contact with one another, and means common to said friction wheels for imparting rotation to each thereof about its own axis in its various radial positions during such radial movement thereof, and causing the sides of the said friction wheels next to the common axis to be rotated in the same direction, substantially as set forth.

24. In a device of the class described, the combination of a plurality of rotatable wheels provided with peripherally grooved surfaces and mounted for rotation and radial movement in planes radiating from a common axis, means to move said wheels toward and away from the common axis in said radiating planes, and while out of contact with one another, and means common to said friction wheels for imparting rotation to each thereof about its own axis in its various radial positions during such radial movement thereof, and causing the sides of said wheels next to the common axis to be rotated in the same direction, substantially as set forth.

25. In a device of the class described, the combination of a plurality of rotatable friction members in excess of two, said friction members being mounted for rotation and movement toward and away from one another in planes radiating from a common axis, and interconnected means for controlling the to and from movement of said friction members and for imparting rotation thereto during such to and fro movement, substantially as set forth.

26. In a device of the class described, the combination of a plurality of rotatable friction members in excess of two, said friction members being mounted for rotation and movement toward and away from one another in planes radiating from a common axis, and interconnected means for controlling the to and fro movement of said friction members, so that adjacent sides thereof are moved in the same direction during such to and fro movement, substantially as set forth.

27. In a device of the class described, the combination of a plurality of rotatable friction wheels in excess of two, said friction wheels being provided with peripherally grooved friction surfaces and mounted for rotation toward and away from one another in planes radiating from a common axis, and interconnected means for controlling the to and fro movement of said friction wheels, and for imparting rotation thereto during such to and fro movement, substantially as set forth.

28. In a device of the class described, the combination of a plurality of rotatable friction wheels in excess of two, said friction wheels being provided with peripherally grooved surfaces mounted for rotation and movement toward and away from one another in planes radiating from a common axis, and interconnected means for controlling the to and fro movement of said friction wheels, and rotating said friction wheels so that adjacent sides thereof are moved in the same direction during such to and fro movement, substantially as set forth.

29. In a device of the class described, the combination of a plurality of rotatable friction members in excess of two, said friction members being mounted for rotation and movement toward and away from one another in planes radiating from a common axis, and means comprising a common rotatable member for controlling the to and fro movement of said friction members and for imparting rotation thereto during such to and fro movement, substantially as set forth.

30. In a device of the class described, the combination of a plurality of rotatable friction members in excess of two, said friction members being mounted for rotation and movement toward and away from one another in planes radiating from a common axis, and means comprising a common rotatable member for controlling the to and fro movement of said friction members and for rotating said friction members so that adjacent sides thereof are moved in the same direction during such to and fro movement, substantially as set forth.

31. In a device of the class described, the combination of a plurality of rotatable friction wheels in excess of two, said friction wheels being provided with peripherally grooved friction surfaces and mounted for rotation and movement toward and away from one another in planes radiating from a common axis, and means comprising a common rotatable member for controlling the to and fro movement of said friction wheels, and for imparting friction thereto during such to and fro movement, substantially as set forth.

32. In a device of the class described, the combination of a plurality of rotatable friction wheels in excess of two, said friction wheels being provided with peripherally grooved surfaces mounted for rotation and movement toward and away from one another in planes radiating from a common axis, and means comprising a common rotatable member for controlling the to and fro movement of said friction wheels, so that adjacent sides thereof are moved in the same direction during such to and fro movement, substantially as set forth.

33. In a device of the class described, the combination of a plurality of friction members movable toward and from one another, spring actuated means for moving said friction members apart, and mechanical means driven from a common source of power for positively moving said friction members toward one another, substantially as set forth.

34. In a device of the class described, the combination of a plurality of grooved friction wheels movable toward and from one another, spring actuated means for moving said wheels apart, and mechanical means driven from a common source of power for positively moving said wheels toward one another, substantially as set forth.

35. In a device of the class described, the combination of a plurality of rotating friction members movable toward and away from one another, spring actuated means for moving said members apart, means for rotating the said wheels in the various positions of their movement, and mechanical means driven from a common source of power for positively moving said friction wheels toward one another, substantially as set forth.

36. In a device of the class described, the combination of a plurality of grooved friction wheels movable toward and away from one another, means for rotating said friction wheels so that their adjacent sides travel in the same direction during the various positions of their movement, spring actuated means for moving said wheels away from one another, and positive mechanical means driven from a common source of power for moving said wheels toward one another, substantially as set forth.

37. In a device of the class described, the combination of a plurality of rotatable friction members movable toward and away from one another, spring actuated means for moving said friction members apart, positively actuated mechanical means for moving said members toward one another, and means for rotating said members, the last named means and said means for moving the friction members toward each other comprising a common rotating element, for the purposes set forth.

38. In a device of the class described, the combination of a plurality of rotatable friction members movable toward and away from one another, spring actuated means for moving said friction members apart, driving means, and means actuated from said driving means for retarding and positively controlling the separation of said friction members, for the purposes set forth.

39. In a device of the class described, the combination of a plurality of rotating friction wheels movable toward and away from one another, spring actuated means for moving said friction wheels apart, means driven from a common source of power for retarding and positively controlling the separation of said friction wheels, and means for rotating said friction wheels in their various positions, substantially as set forth.

40. In a device of the class described, the combination of a plurality of rotatable friction members movable toward and away from one another, spring actuated means for moving said friction members apart, positively actuated mechanical means for moving said members toward one another, and means interconnected with said mechanical means for rotating said friction members so that the adjacent sides thereof travel in the same direction, the last named means and said means for moving the friction members toward each other comprising a common rotating element, for the purposes set forth.

41. In a device of the class described, the combination of a plurality of rotatable friction members movable toward and away from one another, spring actuated means for moving said members apart, driving means, and means actuated from said driving means for retarding the separation of said members and moving said members toward one another and acting against the said spring actuated means, for the purposes set forth.

42. In a device of the class described, the combination of a plurality of rotating friction members movable toward and away from one another, spring actuated means for moving said members apart, and positively actuated mechanical means driven from a common source of power for retarding the separation of said members and for moving said members toward one another and acting against said spring actuated means, and means for constantly rotating said friction members, substantially as set forth.

43. In a device of the class described, the combination of a plurality of friction members mounted for rotation and for movement toward and away from one another in planes radiating from a common axis, spring actuated means for moving said members apart, and positive mechanically actuated means for recurrently moving said members toward one another, substantially as set forth.

44. In a device of the class described, the combination of a plurality of grooved friction wheels mounted for rotation and for movement toward and away from one another in planes radiating from a common axis, spring actuated means for moving said wheels apart, and positive mechanically actuated means for recurrently moving said wheels toward one another, substantially as set forth.

45. In a device of the class described, the combination of a plurality of rotatable friction members mounted for rotation and for movement toward and away from one another in planes radiating from a common axis, spring actuated means for moving said members apart, and positive mechanically actuated means for recurrently moving said members toward one another, substantially as set forth.

46. In a device of the class described, the combination of a plurality of grooved friction wheels mounted for rotation and for movement toward and away from one another in planes radiating from a common axis, spring actuated means for moving said wheels apart, positive mechanically actuated means for recurrently moving said wheels toward one another, and means for rotating said wheels so that their adjacent sides travel in the same direction, substantially as set forth.

47. In a device of the class described, the combination of a plurality of rotatable friction members mounted for rotation and for movement toward and away from one another in planes radiating from a common axis, spring actuated means for moving said friction members apart, and positively actuated mechanical means for recurrently moving said members toward one another, and means for rotating said members, the last named means and said means for moving the friction members toward one another comprising a common rotating element, substantially as set forth.

48. In a device of the class described, the combination of a plurality of rotatable friction members mounted for rotation and for movement toward and away from one another in planes radiating from a common axis, spring actuated means for moving said friction members apart, and positive mechanically actuated means for retarding and controlling the separation of said friction members, and for recurrently moving the friction members toward one another substantially as set forth.

49. In a device of the class described, the combination of a plurality of rotatable friction members mounted for rotation and for movement toward and away from one another in planes radiating from a common axis, spring actuated means for moving said friction members apart, positive mechanically actuated means for retarding and controlling the separation of said friction members, and for recurrently moving the friction members toward one another and means for rotating said friction members so that the adjacent sides thereof travel in the same direction, substantially as set forth.

50. In a device of the class described, the combination of a plurality of rotatable friction members mounted for rotation and for movement toward and away from one another in planes radiating from a common axis, spring actuated means for moving said friction members apart, positive mechanically actuated means for recurrently moving said members toward one another, and means interconnected with said mechanical means for rotating said friction members so that the adjacent sides thereof travel in the same direction, substantially as set forth.

51. In a device of the class described, the combination of a plurality of rotatable friction members mounted for rotation and for movement toward and away from one another in planes radiating from a common axis, spring actuated means for moving said members apart, positive mechanically actuated means for retarding and controlling the separation of said members and for recurrently moving said members toward one another, and acting against the said spring actuated means, substantially as set forth.

52. In a device of the class described, the combination of a plurality of rotatable friction members mounted for rotation and for movement toward and away from one another in planes radiating from a common axis, spring actuated means for moving said members apart, positive mechanically actuated means for retarding and controlling the separation of said members and for recurrently moving said members toward one another and acting against said spring actuated means, and means interconnected with said positive mechanically actuated means for constantly rotating said friction members, substantially as set forth.

53. In a device of the class described, the combination of a machine frame provided with a central opening and having a combined master gear and cam rotatably received therein and leaving a large opening at the center, a plurality of slides having friction wheels rotatably mounted thereon, said slides being movable radially to and away from one another, splined shaft connections for rotating said friction wheels from said master gear and means actuated by said cam for moving said slides and friction members toward and away from one another, for the purposes set forth.

54. In a device of the class described, the combination of a machine frame, a plurality of friction wheels, movable toward and away from one another, means for imparting continuous rotation thereto, a spider-like rearward extension of said machine frame provided with a guideway, a slide movable toward and away from the main frame in said guideway, means for imparting movement to said slide and bell cranks pivotally mounted on said frame and connected with said slide for controlling the movement of the friction wheels toward and away from one another, for the purposes set forth.

55. In a device of the class described, a plurality of friction wheels each having a rubber friction surface and having a grooved friction periphery, a plurality of radially disposed slides in which said friction members are mounted for rotation, each of said slides being provided with a shaft for driving its friction wheels, bevel gear connection between said shafts and friction wheels, fixed gears splined on said shafts and adapted to rotate said shafts and permit the same to be moved lengthwise therein, a master gear engaging each of the last named gears, a cam attached to said master gear, a slide movable toward and away from said combined master gear and cam, a lever pivoted to the machine frame, a roller on said lever in contact with the surface of said cam, said lever being pivoted to said slide, a plurality of bell crank levers pivoted to the machine frame and pivotally attached to said slide at the extremity of one arm thereof and having the opposite arm bearing upon the radially arranged slides bearing the friction wheels, and springs for exerting pull tending to separate said friction wheels, for the purposes set forth.

In witness whereof I have signed this specification in the presence of two subscribing witnesses this 14th day of April, 1913.

BRUCE V. EDWARDS.

Witnesses:
R. NORMAN BROUGH,
EUGENE F. BAERENRODT.